United States Patent

Nugent et al.

[15] 3,666,907

[45] May 30, 1972

[54] APPARATUS FOR ASSEMBLING FLAT PACKS

[72] Inventors: Reginald F. Nugent, Yardley, Pa.; George P. Snyder, Trenton, N.J.

[73] Assignee: Time Research Laboratories, Inc., Pennington, N.J.

[22] Filed: Nov. 6, 1969

[21] Appl. No.: 874,506

[52] U.S. Cl. ....219/85, 219/347, 219/405, 228/1

[51] Int. Cl. ....B23k 1/02

[58] Field of Search ....219/85, 128, 347, 349, 354, 219/405, 411, 79, 80; 29/503, 626, 589; 228/1, 4

[56] References Cited

UNITED STATES PATENTS

| | | | |
|---|---|---|---|
| 3,486,004 | 12/1969 | Morrone | 219/347 X |
| 3,465,116 | 9/1969 | Dix | 219/85 |
| 3,477,119 | 11/1969 | Smith | 219/128 X |
| 2,397,400 | 3/1946 | Barwich | 228/1 UX |
| 3,051,826 | 8/1962 | Avila | 219/85 X |
| 2,788,432 | 4/1957 | Moles | 219/85 |

*Primary Examiner*—R. F. Staubly
*Assistant Examiner*—L. A. Schutzman
*Attorney*—Frederick J. Olsson

[57] ABSTRACT

Apparatus for connecting the bases and lids of flat packs including a dry box, flat pack handling mechanism inside of the box, an infra-red heat source outside of the box with its energy transmitted through the window means to flat packs secured by the handling mechanism inside the box, a shuttle to take the flat packs in and out of the box and means to vibrate the handling mechanism so as to apply vibratory mechanical energy to the flat packs when exposed to infra-red energy.

8 Claims, 8 Drawing Figures

INVENTORS.
Reginald F. Nugent
George P. Snyder
BY
Frederick J. Olsson
ATTORNEY.

INVENTORS.
Reginald F. Nugent
George P. Snyder
BY
Frederick J. Olsson
ATTORNEY.

INVENTORS.
Reginald F. Nugent
George P. Snyder
BY
Frederick J. Olsson
ATTORNEY.

INVENTORS.
Reginald F. Nugent
BY George P. Snyder

Frederick J. Olsson
ATTORNEY.

APPARATUS FOR ASSEMBLING FLAT PACKS

This invention in general relates to apparatus for use in the manufacture of solid state devices and more specifically the invention relates to apparatus for connecting the lids and bases of solid state devices commonly known as flat packs.

In one aspect the invention provides apparatus for highly advantageously carrying out methods of our copending application, Ser. No. 847,374 filed Aug. 4, 1969.

One of the objects of the invention is to provide apparatus for use in hermetically sealing the lids and bases of flat packs irrespective of whether the lid and base are metal, glass ceramic or combinations of the same.

Another object of the invention is to provide apparatus for use in hermetically sealing the lids and bases of flat packs on a high production basis with yields approaching 100% as compared with yields substantially lower as now attained with present day equipment.

Another object of the invention is to provide apparatus for connecting the lids and bases of flat packs confined in a miniaturized dry box containing an inert gas atmosphere while being exposed to infra-red energy through window means in the box.

Another object of the invention is to provide apparatus for use in connecting the lids and the bases of flat packs within a miniaturized dry box containing an inert gas atmosphere while receiving both infra-red energy and vibratory mechanical energy.

Another object of the invention is to provide apparatus for connecting the lids and bases of flat packs, the apparatus including infra-red heat source means, a reciprocating shuttle used for transporting groups of flat packs to a station for exposure to the infra-red and returning groups of flat packs already exposed from the station, the shuttle being in the return condition for the unloading of already exposed or assembled packs at the time another group is being exposed to the infra-red.

Another object of the invention is to provide apparatus for connecting the lids and bases of flat packs within a miniaturized dry box, the box being characterized by structure which provides that the hands of the operator can be kept free from the inside of the box for both loading and unloading of the packs and for positioning the same for the connecting operation.

Another object of the invention is to provide apparatus for connecting the lids and bases of flat packs including infra-red heat source means and a reciprocating shuttle for transporting flat packs to and from the heat source, the shuttle being constructed and operated in a manner so that it remains cool enough to be touched by the operator's hands for the loading and unloading operation.

Another object of the invention is to provide apparatus for use in connecting bases and lids of flat packs including an infra-red heat source, a single shuttle on which a group of flat packs can be loaded and then moved by the shuttle adjacent or into the infra-red source where a gripper means removes the group (while the shuttle moves away) and holds the same for exposure to the infra-red and then after exposure the shuttle again moves up to receive the group from the gripper and then moves away so that the group can be unloaded an replaced by the next successive group.

Another object of the invention is to provide apparatus for use in connecting the bases and lids of flat packs including an infra-red source, a single shuttle on which a group of packs can be loaded and then moved by the shuttle adjacent or into the infra-red where gripper means removes the group (while the shuttle moves away) and then holds and vibrates the group during exposure to the infra-red and then after exposure the shuttle moves up to receive the group from the gripper and then moves away so that the group can be unloaded and replaced by the next successive group.

Another object of the invention is to provide apparatus for connecting the lids and bases of flat packs in an inert gas atmosphere characterized by a miniaturized dry box for containing the desired atmosphere and an infra-red source outside of, but closely adjacent the box, together with means to successively present groups of packs to be connected, a group first being loaded on a shuttle and then inserted into the dry box, taken off the shuttle and held to receive radiant energy through windows in the box and then picked up by the shuttle and removed from the box in the connected condition whereby to be unloaded and replaced by the next successive group.

The invention will be described below in connection with the following drawings wherein.

Before proceeding, it is pointed out that the invention is useful in the hermetic sealing of the various types of flat packs. For example, in cases where both the base and lid are metal or one is metal and the other ceramic, a solder preform is used for connecting the two components. Where both the base and the lid are ceramic no solder preform is used inasmuch as the lid ordinarily will have a glass frit. In either instance, the solder or glass frit is melted and then cooled for connecting the lid and base together. It is essential that the condition of the joint be such that the interior of the flat pack is hermetically sealed. The equipment of the invention provides a means for obtaining this essential characteristic. In those instances where solder is used for connecting the base and the lid, the connecting operation is performed out without the use of flux in an inert gas atmosphere provided by a dry box.

Also, it is pointed out that although the invention will be described in connection with the assembly of flat packs, those skilled in the art will understand that the equipment is readily adaptable for use in applying energy to other solid state devices.

Figure 1:
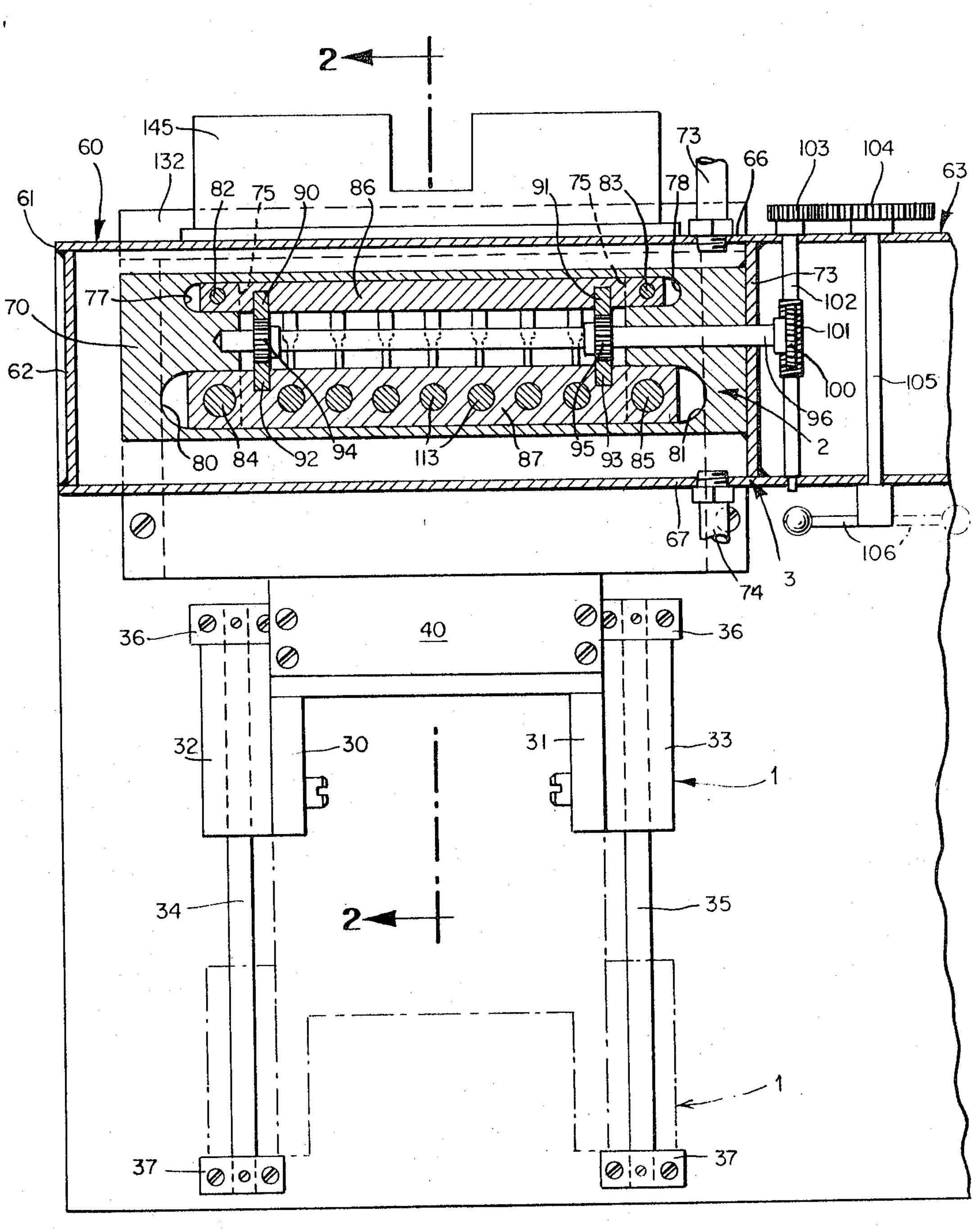
FIG. 1 is a plan view partially in section illustrating the relationship of certain components of the invention, the view being taken along the lines 1—1 of FIG. 2.
Figures 2, 5:
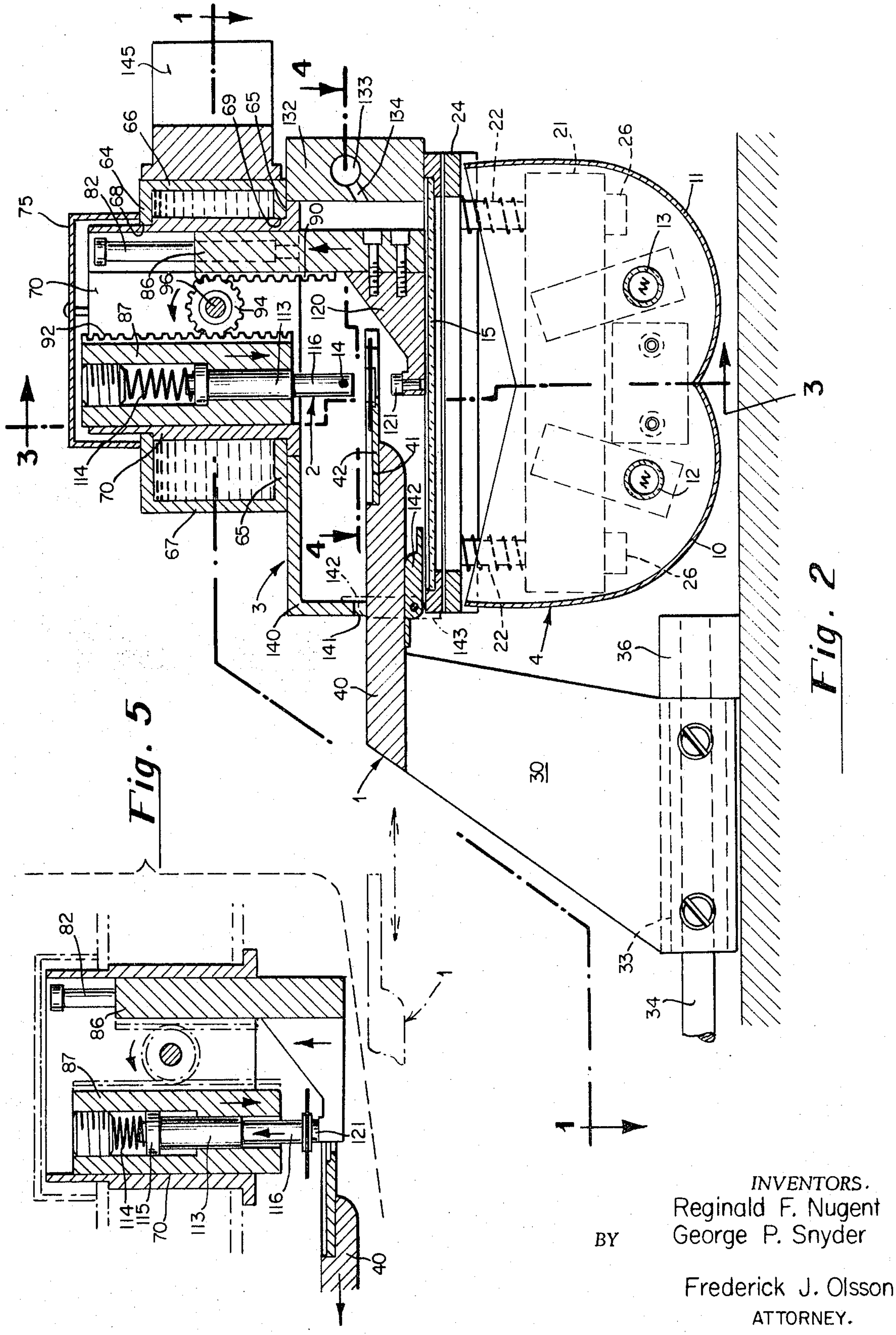
FIG. 2 is an elevation view partially in section taken along the lines 2—2 of FIG. 1.
FIG. 5 is a fragmentary view of certain of the parts of FIG. 2.

In FIGS. 1 and 2 the reciprocating shuttle mechanism for transporting the flat packs is indicated at 1. The gripping mechanism for holding the flat packs during the connection operation is indicated at 2. The dry box within which the gripping mechanism is disposed is indicated at 3 and the infra-red lamp means at 4. These components are described following.

The infra-red lamp means comprises a pair of elongated reflectors 10 and 11 each with a hot filament within a quartz iodine envelope, the envelopes and filaments being generally indicated at 12 and 13. The filaments generate radiant energy in the infra-red band. The filament envelope structure is conventional.

Figure 3:
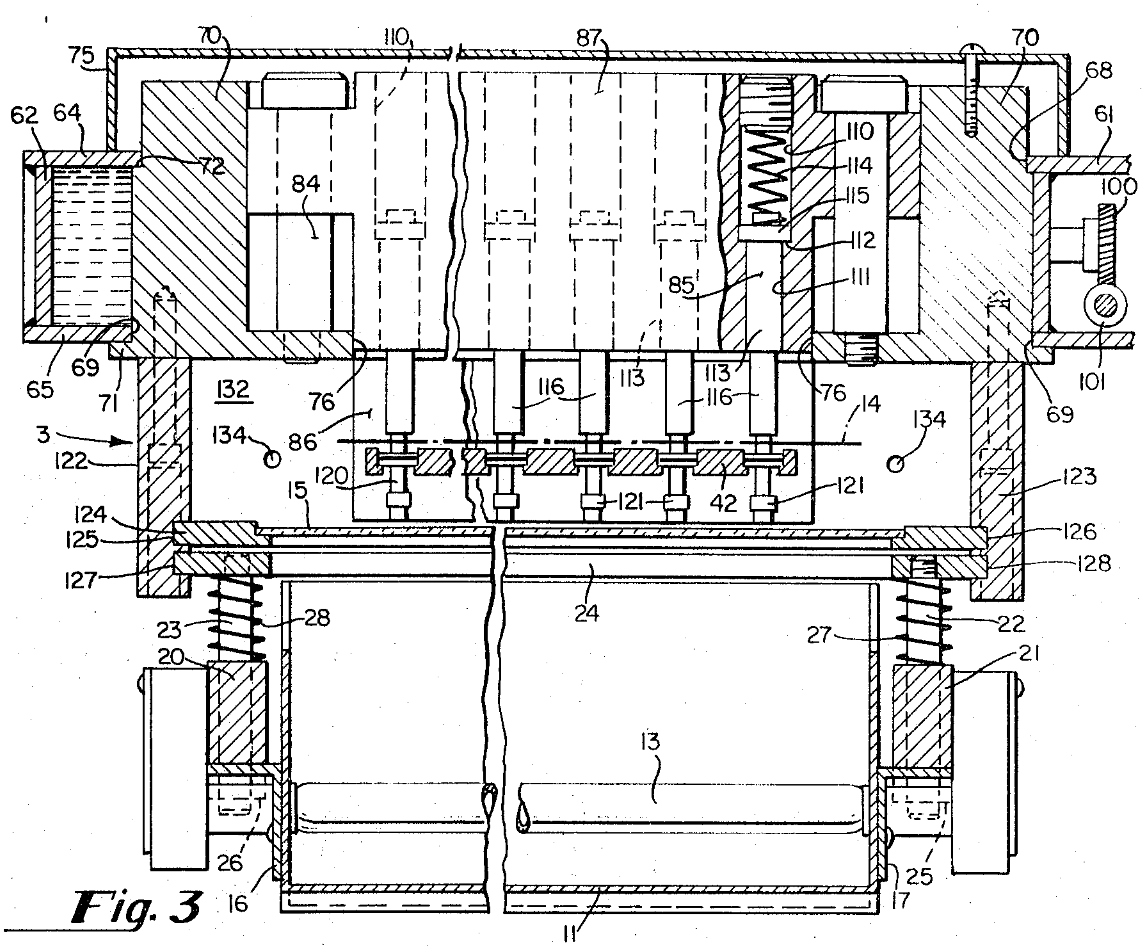
FIG. 3 is a sectional elevational view taken along the lines 3—3 of FIG. 2.

The reflectors 10 or 11 are identical in cross section and are formed in a generally eliptical fashion with the filaments respectively at one of the focal points. The structure is such that the radiant energy from each lamp is reflected upwardly and concentrated at the other focal point in a tube-like area which in FIG. 2 is indicated by the dot 14. In FIG. 3 the tube-like area is indicated by the heavy dot and dash lines 14 which, in the embodiment as shown, extends generally horizontally and is located within dry box 3. The tube-like area is effectively a three dimensional heating zone. The concentration area or heating zone is chosen so that flat packs within the same are sufficiently exposed and the temperature of the components will be raised.

The interior surfaces of the reflectors are preferably gold plated and highly polished to obtain the maximum efficiency in transmitting energy to the tube-like area or heating zone.

At this juncture it is pointed out that the infra-red energy enters the dry box through a quartz plate or window 15 which forms part of the dry box as will be explained later.

The lamp means has a suspension type mounting which provides for shifting the heating zone. This is explained following.

On opposite ends of the reflectors (FIG. 3) are the angles 16 and 17 respectively secured to bars 20 and 21. The bar 21 and angle 17 are slidably disposed on a pair of studs 22 while the bar 20 and angle 16 are slidably disposed on a pair of studs 23. The studs are connected to an annular frame 24 supported from the dry box 3. The nuts 25 on the studs 22 and the nuts 26 on the studs 23 hold the respective angles and bars. The springs 27 on the studs 22 and the springs 28 on the studs 23 hold the bars and angles firmly against the nuts. By adjusting the various nuts, the reflector and envelope assembly can be moved in a vertical direction. Also, it is pointed out that slots (not shown) formed in the bars and angles enable the assembly to be shifted transversely or left and right as viewed in FIG. 3.

The principal function of the shuttle mechanism is to transport groups of flat packs to and from the heating zone or tube-like area 14. The structure of the shuttle to accomplish the foregoing will be explained below.

With reference to FIG. 2 a shuttle mechanism is movable as between a transfer position shown on the full lines and a load-unload position (left hand side) as shown by the dot and dash lines. The shuttle includes the legs 30 and 31 respectively secured to bearing blocks 32 and 33. The bearing blocks are mounted on the guides 34 and 35 for reciprocating motion back and forth between the transfer and the load-unload positions. The blocks 36 and 37 define the limits of shuttle travel and also support the guide rods 34 and 35.

On top of the legs 30 and 31 is a plate 40, the outer end of which (see FIG. 2) is provided with a shoulder 41 carrying another plate 42 which is configured to form a plurality of cradle means for supporting the flat packs.

Figure 4:
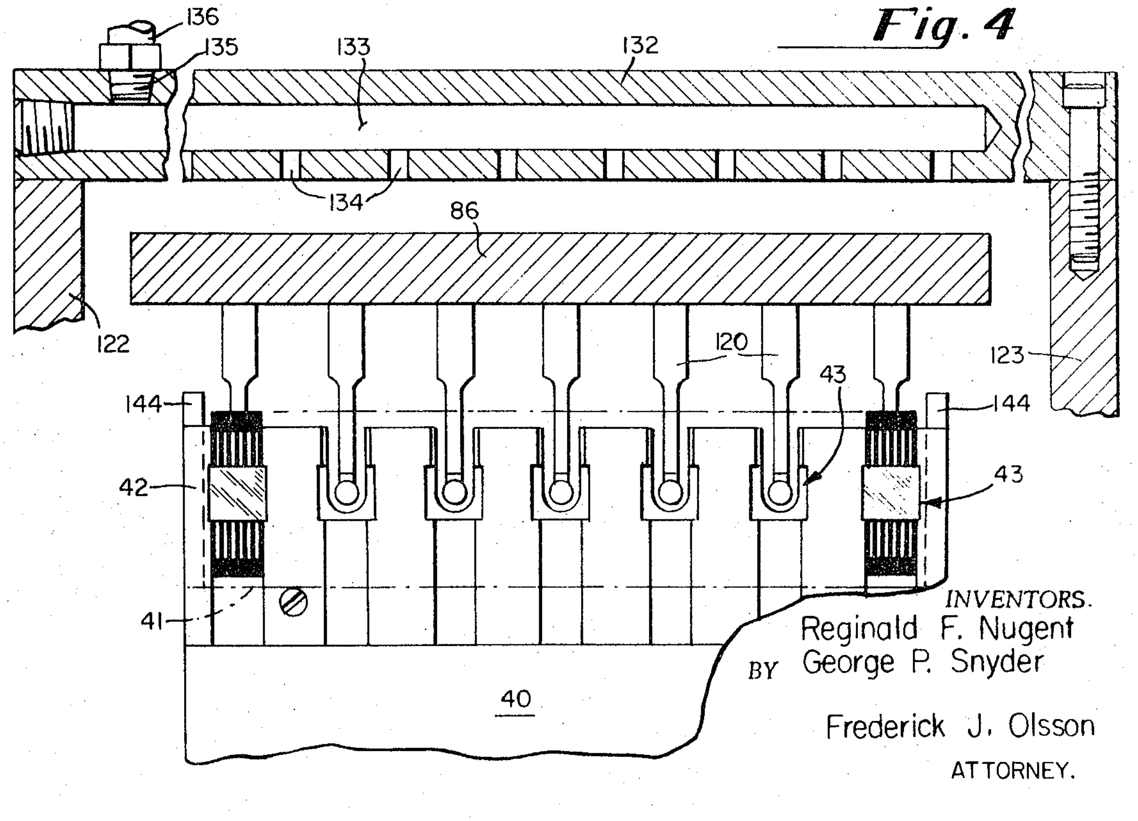
FIG. 4 is a plan sectional view taken along the lines 4—4 of FIG. 2.

With reference to FIG. 4 it will be observed that the cradles 43 are identical in construction. The description of the cradles will be in connection with FIG. 6. The cradle 43 comprises an elongated slot 44 which is cut out at the area indicated at 45. Also, the bottom of the slot 44 at the area 45 is undercut as indicated at 46. There is an under-cut which opens the bottom as indicated 47. The structure described is designed to accept a flat pack, as for example, the flat pack 48 in FIG. 6. The base and lid of the flat pack are nested within the cut outs 45 and 46 with the terminals 49 extending out in the slot 44.

In assembling a flat pack, the cover 51 is first pushed into the undercuts 45 and 46. A preform, such as a preform 52, is then dropped into the cutout 45 on top of the cover. Lastly, the base 53 is dropped in the cutout 45 on top of the preform with the terminals 54 extending outwardly into the slot 44.

Before passing on, it is pointed out that the cradle structure described can be conveniently modified in size and shape to fit the dimension of the particular flat pack. Also, the dimensions can be modified to accept ceramic type flat packs. In the latter case, a cutout section 45 and 46 are arranged to accept the cover and then base put down on top of the cover in the cutout 45 with the terminals extending out through the slot 44.

With reference to FIG. 2 it will be observed that when the shuttle is in the transfer position (full line), the cradle means support the flat packs in or adjacent to the tube-like area depending upon the cross section.

The handling mechanism which holds the flat packs for exposure to the infra-red energy and which can be vibrated for imparting mechanical vibratory energy to the flat packs while exposed to the infra-red, will be described below. Inasmuch as a water jacket surrounds the handling mechanism, the jacket structure will also be explained. The general function of the handling mechanism is to take the flat packs and remove the same from the cradles and dispose within the tube-like area for a proper exposure and thereafter deposit the flat packs on the cradles.

With reference to FIG. 1 the numeral 60 represents an elongated, rectangular shaped horizontally extending tube which has been cut off at 61 and the end closed by the plate 62. The tube extends to the right beyond the point 63 where it is rigidly supported by conventional means not shown. The tube then is a cantilver member which, as will be presently apparent, supports the gripping mechanism 2, the dry box 3 and lamp means 4. The tube has a top 64, a bottom 65 and side walls 66 and 67.

The top and bottom 65 of the tube (see FIGS. 2 and 3) are respectively provided with the cutouts 68 and 69 into which is fitted a central block 70. The block 70 has a flange 71 which engages the tube bottom 65 and a shoulder 72 which engages the tube top 64. The tube and block are welded together or otherwise joined to make a water tight connection.

Referring to FIG. 1, a plate 73 firmly abuts the right hand end of the block 70 and is joined to the side walls 66 and 67 of the tube to make a water tight connection therewith.

The tube, the plates 62 and 73 and the block 70 form a water jacket. A connector 73 forms a water inlet and connector 74 forms a water outlet. The connectors 73 and 74 are connected to a pump (not shown) to provide for circulation of water through the jacket. The circulating water cools the equipment.

A cover 75 mounted on tube 60 extends over the top of the block 70 and seals the top of the block from the atmosphere. The details of the handling mechanism will now be explained.

With reference to FIGS. 1 and 3, the block 70 is provided with a central aperture 76 and slots 77 and 78 and 80 and 81. The bottoms of the slots 77, 78, 80 and 81 respectively carry posts 82, 83, 84 and 85.

A block member 86 is slidably mounted on the posts 82 and 83 for motion in a vertical direction. A block member 87 is slidably mounted on posts 84 and 85 for motion in a vertical direction. The configuration of the blocks (in elevation) is shown in FIG. 3 for the block 87. The block 86 is similarly configured.

The block 86 has a pair of vertically extending racks 90 and 91 and the blocks 87 has a pair of vertically extending racks 92 and 93. The racks 90 and 92 mesh with a pinion 94 while the racks 91 and 93 mesh with the pinion 95. The pinions 94 and 95 are connected to a shaft 96 which is rotatably supported in the block 70 and extends out to the right (FIG. 1) terminating a worm-wheel 100. Worm-wheel 100 engages a worm 101 on a shaft 102 rotatably mounted in the tube 60. The shaft 102 carries a pinion 103 which meshes with another pinion 104 mounted on the shaft 105 also rotatably supported by the tube 60. The shaft 105 carries the handle 106. The handle 106 is rotated between an open position (full line) and a closed position (dotted lines).

By rotation of the handle 106 the racks 90–91 and block 86 are moved vertically in one direction while the racks 92–93 and block 87 are moved vertically in the opposite direction. Thus, when the block 86 is moving up the block 87 is moving down. This is indicated in FIG. 2 by the arrows.

With reference to FIG. 3 the block 87 is provided with a plurality of spaced apart identical bores 110. Each bore has a reduced section 111 which forms the shoulder 112. The bores 110 mount the plungers 113 for reciprocating motion in a vertical direction with respect to the blocks 87. Each bore carries a spring 114 which engages an enlarged head 115 on the plunger to push the same down against the shoulder or stop 112. Each plunger has a gripper 116 which holds the flat packs as will be presently described.

The block 86 carries a plurality of arms 120 which extend outwardly and underneath the block 87. Each arm carries a gripper 121. The grippers 121 are respectively in axial alignment with the grippers 116 as indicated in FIGS. 2 and 3 to form a pair of grippers. The number of pair of grippers corresponds to the number of flat packs or number of cradles in the shuttle. As shown, the grippers are in the open position which corresponds to the open position of handle 106. The grippers are closed upon the flat packs by rotation of handle 106 to the closed position as will be presently described.

The manner in which the handling mechanism operates to remove the flat packs from the cradles, place the same in position for receiving infra-red energy and then deposit the worked flat packs back on the cradles will next be described.

Assume first that the grippers 116 and 121 are in the open position as shown in FIG. 1 with each of the cradles 43 in the shuttle supporting a flat pack to be worked and that the handle 106 (FIG. 1) is in the open position.

Figures 6, 7, 8:
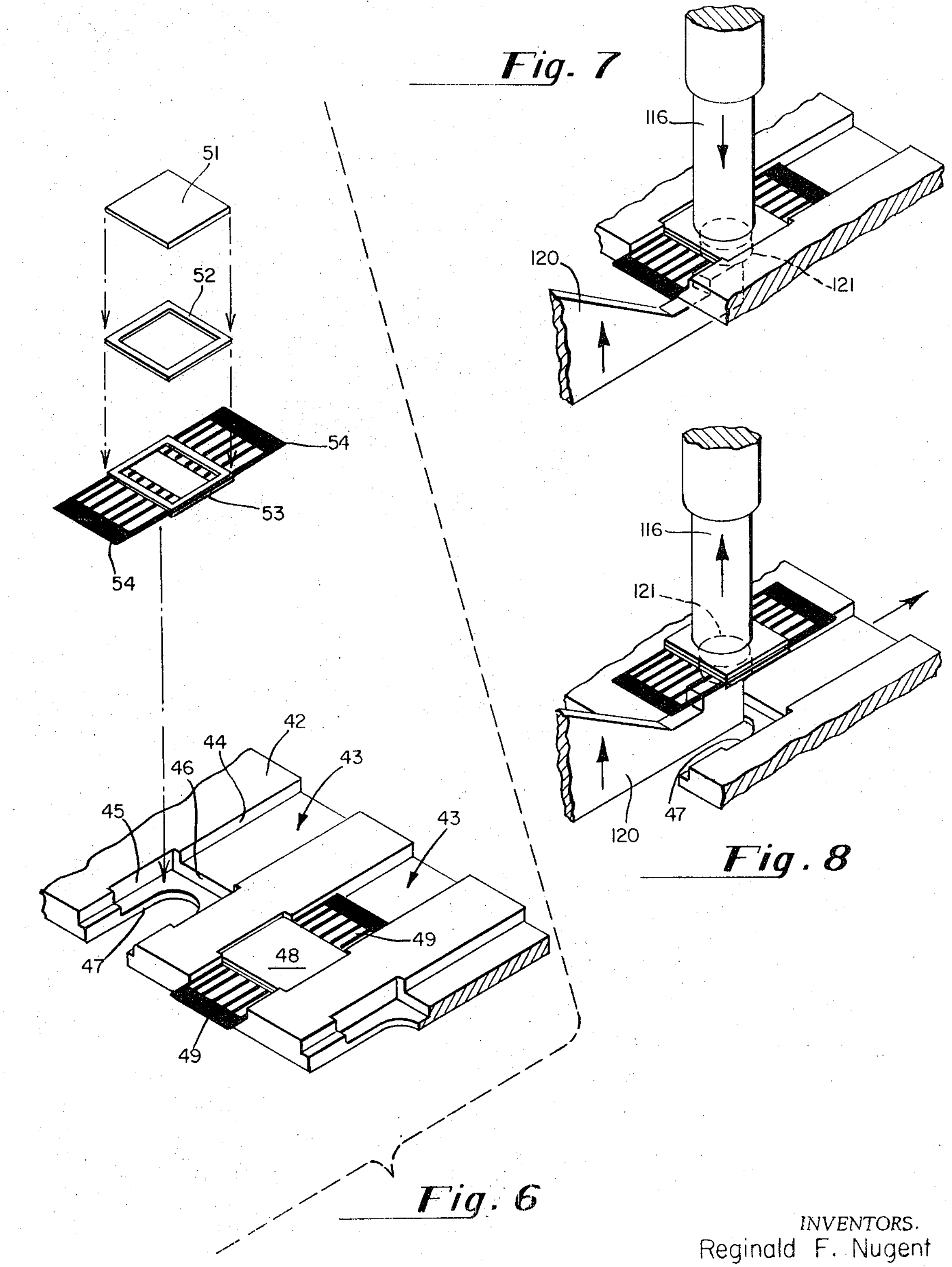
FIG. 6 is an exploded perspective view illustrating the manner in which the flat packs are loaded.
FIGS. 7 and 8 are fragmentary perspective views showing how a flat pack is moved off the shuttle.

The handle 106 is rotated to the closed position. As the handle 106 begins to turn, the grippers 116 start to move down and the grippers 121 start to move up. The grippers 116 engage the bases of the flat packs just before the grippers 121 move up through slots 47 to engage the lid of the packs. When the grippers 116 engage the bases the springs 144 exert pressure against the plungers to hold the flat packs firmly down in the cavities. Then the grippers 121 engage the lids of the flat packs. This condition is shown in FIG. 7. As the arm 120 continues upward, the motion lifts the gripped packs out of the cradles as shown in FIG. 8. Incidentally, downward motion of the block 87 is permitted because the block and plungers are relatively movable.

As the handle 106 continues to rotate, the upward motion continues until the flat packs are within the tube-like area 14. At this point the handle 106 is in the closed position. The relationship of the various parts in this position is shown in FIG. 6. The gripped packs are now ready to receive infra-red energy. The spring loaded grippers maintain pressure on the lid and base during the application of the mechanical and infra-red energy.

Incidentally, it is to be observed that as the arms 120 and grippers 121 move the flat packs upwardly, the grippers 116 and plungers move back in the bores 110 against the pressure of the springs 114.

After the infra-red energy and vibratory energy has been applied to the flat packs and the lids sealed to the covers, the energy application is terminated. The carriage is then moved into transfer position. At that time the handle 106 is moved to the closed position. The reverse action to that described above takes place and the flat packs are back in the cradles. The handle is then moved to the open position to open the grippers. The shuttle is then moved out to the left, taking the worked flat packs with it.

From the foregoing description it will be seen that the transfer operation takes place wholly within the dry box 3. The manner in which the dry box is constructed so as to contain the grippers and to permit entrance and exit of the shuttle will be explained below.

With reference to FIGS. 3 and 4, the sides of the dry box are formed by the walls 122 and 123 which are suspended from the block 70. The bottom of the box is formed by the quartz plate 15 supported by the annular frame 124 carried in slots 125 and 126 in the walls 122 and 123. The slots 127 and 128 carry the frame 24.

The slots 125, 126, 127 and 128 are formed in the walls 122 and 123 so that both frames can be conveniently pulled out of the wall, that is to say, moved in a direction out of the plane of the paper.

The back of the dry box is formed by the wall 132 which is fixed to the side walls 122 and 123. The wall 132 has a gas manifold 133 and passageways 134 communicating the manifold with the interior of the box. The connector 135 and the line 136 connect the manifold to a gas source not shown.

The front wall of the box is formed by the partition 140 (FIG. 2) which fits over the side walls 122 and 123 and up under the bottom wall 65 of the tube 60. The front wall 140 has an opening 141 over which extends the spring loaded door 142. When the shuttle is in the load-unload position the door assumes the closed position as shown by the dotted lines. In the closed position, the wing 143 on the door extends down over the quartz plate frame 125 and covers the slots 125 and 126.

When the shuttle is moved from the load-unload position toward the transfer position the abutments 144 on the plate 42 engage the door 142 and causes the same to be moved down to the open position as shown in the full lines.

With respect to the function of the dry box, it is pointed out that the various components described above are manufactured and assembled under relatively tight dimensional tolerances. The assembled parts, however, are not interfitted together in a manner so as to make a complete gas seal, but are fitted together sufficiently to retard the flow of gas. Thus, inert gas is injected into the chamber through the passageways 134 at a rate related to the leakage of the gas so as to ensure that the chamber has been purged of oxygen and is under a full complement of inert gas during the time the flat packs are receiving the infra-red and mechanical energy.

With reference to FIGS. 1 and 2 it will be seen that the wall 66 of the water jacket carries the transducer means 145. When the transducer is energized, it sets up vibrations in the connected structure and in the water flowing through the jacket. These vibrations occur in the various grippers 116–121 and thus apply vibratory mechanical energy to the flat packs supported between the grippers.

The preferred manner of operating the equipment for working flat packs using solder preforms to connect the lid to the base will be described below.

First of all the infra-red and mechanical energy sources 4 and 142 are de-energized and the handle 106 is turned to the open position and the shuttle is moved back to the load-unload position. Then the operator loads a lid in each of the cradles. This is followed by a solder preform and the base.

The shuttle is then pushed forward to the transfer position. The handle 106 is then turned to the closed position so that the grippers then remove the flat packs from the cavities as heretofore described. The shuttle is then moved back to the load-unload position.

The infra-red source is then energized preferably at a voltage and over a length of time such that the components are heated at a rate so as to avoid damage as by thermal shock. The heating continues until just before or during the time the solder begins to melt and then the transducer 145 is energized. The infra-red remains on and along with the transducer for several seconds giving the solder time to flow properly. Then the infra-red and the transducer are de-energized. The solder will then assume the solid state. The shuttle is moved up to the transfer position and then the operator moves the handle 106 to the open position so that the group of flat packs are deposited back in the cavities. The handle is again turned to open position and the shuttle pulled out to the load-unload position. The worked flat packs are then removed from the shuttle and a new group inserted.

A few general comments on the equipment described are set out below.

The water flowing in the jacket acts as a heat sink and conducts heat away from the various connected parts and this, of course, has the effect of lowering the temperature. The various parts of the grippers, the dry box and the water jacket are constructed of metal and designed so that they receive exposure of the infra-red and consequently have a temperature rise. This rise is such that the parts and configuration stabilize. We have found that even with the apparatus running a full day's shift, for example, at periods wherein the infra-red is on for 35 seconds and off for 65 seconds, the equipment operates entirely satisfactory.

The water is also used in the application of the vibratory mechanical energy to the flat packs for reasons as pointed out in copending application Ser. No. 847,374, filed Aug. 4, 1969.

It will be observed that the shuttle is not exposed to the infra-red at all because the shuttle is in the load-unload position when the infra-red is on. Thus, the shuttle does not heat up and can be touched by the operator's hands without any danger. The cavities holding the flat packs remain cool so that new groups of flat packs are assembled in the same without heat damage.

Further, in connection with the equipment, it will be apparent that it is unnecessary for the operator's hands to ever enter the dry box either for the loading-unloading operation or for the positioning of the flat packs to receive the infra-red and mechanical energy. This is highly advantageous in that over a period of time it saves enormous quantities of inert gas and permits the overall equipment to be relatively small and permits maximum freedom for movement of the operator.

The intermittent type of operation wherein groups of flat packs are successively worked has several advantages. By keeping the group within reasonable limits, the packs can be loaded in the shuttle in a quick, positive manner. The levels of infra-red and the mechanical vibratory energy levels are within easily attainable values and the time required for the actual connecting operation inside of the dry box is short enough to be entirely tolerable so that the machine can be operated in a positive, accurate manner whereby production rates around 100 flat packs per hour with yields approaching 100 percent are attainable.

In certain instances some of the equipment can be eliminated or rendered inoperative. For example, in the connecting of ceramic type flat packs by use of a glass frit, it is unnecessary to accomplish this in an inert gas atmosphere. The equipment can be modified simply by removing the front partition 140 and the door 141 or the dry box can be modified in a manner so that it becomes a suspension frame for the lamp means below.

We claim:

1. Apparatus for applying infra-red and mechanical energy to solid state devices for connecting components thereof comprising:

lamp means for producing radiant energy whose wave length is substantially in the infra-red band, and concentrating said energy in an elongated tube-like area extending generally horizontally;

a shuttle mounted for reciprocating motion along a horizontal axis between a load-unload position and a transfer position, the shuttle having a plurality of cradle means for respectively supporting a plurality of devices, the cradles being serially disposed side-by-side along an axis for positioning the devices in or adjacent to said tube-like area when the shuttle is in the transfer position and substantially separating the devices from the tube-like area when in the load-unload position; and a mechanism for engaging the devices and securely holding the same, and including means for a. deenergizing the lamp when the shuttle is in the transfer position loaded with devices, engaging said devices and removing the same from said cradles and positioning said devices within said tube-like area;

b. holding the devices in the tube-like area for the application for infra-red energy thereto when the lamp is energized;

c. replacing the devices in the respective cradles and releasing the same for movement with the shuttle to the load-unload position when the lamp is deenergized and the shuttle is in the transfer position;

means connected for applying vibratory energy to the devices gripped in said mechanism; and means rendering last said means operable when the devices are receiving infra-red energy.

2. Apparatus for applying infra-red and mechanical energy to flat packs for connecting the bases and lids thereof comprising:

lamp means for producing radiant energy whose wave length is substantially in the infra-red band, and concentrating said energy in an elongated tube-like area extending generally horizontally;

a shuttle mounted for reciprocating motion along a horizontal axis between a load-unload position and a transfer position, the shuttle having a plurality of cradle means for respectively supporting a plurality of flat packs, the cradles being serially disposed side-by-side along an axis for positioning the flat packs in or adjacent to said tube-like area when the shuttle is in the transfer position and substantially separating the flat packs from the tube-like area when in the load-unload position; and a mechanism for engaging the bases and lids of the flat packs and securely holding the flat packs, and including means for:

a. moving the shuttle from the load-unload position to the transfer position when the cradles have been loaded with flat packs;

b. engaging the flat packs and removing the same from said cradles when the shuttle is in transfer position;

c. moving the shuttle from the transfer positon to the load-unload position;

d. holding the flat packs to receive infra-red energy from said lamp means;

e. moving the shuttle from the load-unload position to the transfer position after said application of infra-red;

f. causing the mechanism to replace the flat packs in said cradles and release the same when the shuttle is in the transfer position; and g. causing the shuttle to move from the transfer positon to the load-unload position carrying the flat packs with it; and means connected for applying vibratory energy to the flat packs gripped in said mechanism, last said means being operable for supplying vibratory energy when the flat packs are receiving infra-red energy.

3. Apparatus for applying infra-red and mechanical energy to flat packs for connecting the bases and lids thereof comprising:

lamp means to produce radiant energy whose wave length is substantially in the infra-red band, the energy being concentrated in an elongated tube-like area and extending generally horizontally;

a shuttle mounted for reciprocating motion along a horizontal axis as between a load-unload position and a transfer position, the shuttle having a plurality of cradle means serially disposed side-by-side along an axis for positioning the flat packs in or adjacent to said tube-like area when the shuttle is in the transfer position and substantially separating the flat packs from the tube-like area when in the load-unload position;

a mechanism for simultaneously engaging the bases and lids of the flat packs and securely holding the flat packs and removing the same from the cradles and holding the same in the tube-like area for the application for infra-red energy thereto;

a housing enclosing said mechanism, the housing comprising means substantially sealing the interior thereof from the atmosphere including a quartz plate to receive and to transmit infra-red energy whereby said tube-like area is within said housing;

means on the housing forming a door means operative to provide for a portion of the shuttle to enter the housing in the transfer position and to position the cradles adjacent said tube-like area and to substantially seal the interior of the housing from the atmosphere when the shuttle is removed from said interior, the housing thus forming a dry box for containing an inert gas atmosphere around the flat packs;

means for introducing an inert gas inside the housing; and means connected to apply vibratory energy to the flat packs gripped in said mechanism, last said means being operable for supplying vibratory energy when the flat packs are receiving infra-red energy.

4. Apparatus for applying infra-red energy to solid state devices comprising:

lamp means for producing radiant energy whose wave length is substantially in the infra-red band, and concentrating said energy in an elongated tube-like area extending along an axis;

a shuttle means mounted for reciprocating motion between a load-unload position and a transfer position, the shuttle having a plurality of cradle means for respectively supporting a plurality of devices, the cradles being serially disposed sidelby-side along an axis for positioning the devices in or adjacent to said tube-like area when the shuttle in the transfer position and substantially separating the devices from the tube-like area when in the load-unload position; and a mechanism for engaging said devices and securely holding the same, and including means operable:

a. when the lamp is de-energized and the shuttle is in the transfer position loaded with devices to engage said devices and remove the same from said cradles and position within said tube-like area;

b. when the lamp is energized to hold said devices in the tube-like area for the application for infra-red energy thereto; and c. when the lamp is de-energized and the shuttle is in the transfer position to replace the devices in the respective cradles and release the same for movement with the shuttle to the load-unload position.

5. A construction in accordance with claim 1 wherein said mechanism includes:

a first carrier mounted for reciprocating motion along an axis in a direction toward and away from said tube-like area;

a second carrier mounted for reciprocating motion along an axis parallel to and spaced from first said axis;

a plurality of first grippers mounted for reciprocating motion on said first carrier respectively along axes parallel the carrier axis;

a plurality of springs respectively yieldably biasing the first grippers in a direction toward said tube-like area;

a plurality of second grippers respectively connected to said second carrier, the grippers positioned for motion along axes respectively substantially co-axial with the axes of the first grippers; and means for simultaneously moving the carriers in opposite directions whereby the first grippers move to respectively engage said devices and the second grippers move to engage the devices and then continue to move to lift the devices out of the cradles and move the first grippers back against the spring pressure, last said movement continuing until the devices are in desired position within said tube-like area.

6. Apparatus for applying infra-red energy to solid state devices comprising:

lamp means for producing radiant energy whose wave length is substantially in the infra-red band, and concentrating said energy in an elongated tube-like area extending along an axis;

a shuttle mounted for reciprocating motion between a load-unload position and a transfer position, the shuttle having a plurality of cradle means for respectively supporting a plurality of devices, the cradles being serially disposed side-by-side along an axis for positioning the devices in or adjacent to said tube-like area when the shuttle is in the transfer position and substantially separating the devices from the tube-like area when in the load-unload position; and a mechanism for engaging said devices and securely hold the same, and including means:

a. operable when the cradles have been loaded with devices for moving the shuttle from the load-unload position to the transfer position;

b. for engaging said devices and removing the same from said cradles when the shuttle is in the transfer position;

c. for moving the shuttle from the transfer position to the load-unload position;

d. for holding said devices to receive infra-red energy from said lamp means;

e. for moving the shuttle from the load-unload position to the transfer position after the said application of infra-red;

f. for replacing said devices in said cradles and releasing the same; when the shuttle is in the transfer position; and g. for moving the shuttle to the load-unload position while carrying the devices with it.

7. Apparatus for applying infra-red energy to solid state devices comprising:

lamp means for producing radiant energy whose wave length is substantially in the infra-red band, and concentrating said energy in an elongated tube-like area extending along an axis;

a shuttle mounted for reciprocating motion between a load-unload position and a transfer position,, the shuttle having a plurality of cradle means for respectively supporting a plurality of devices, the cradles being serially disposed side-by-side along an axis for positioning the devices in or adjacent to said tube-like area when the shuttle is in the transfer position and substantially separating the devices from the tube-like area when in the load-unload position;

mechanism for engaging said devices and securely holding the same and for removing the same from the cradles and holding the same in the tube-like area for the application for infra-red energy thereto;

a housing enclosing said mechanism, the housing comprising means substantially sealing its interior from the atmosphere and including quartz means for receiving and transmitting said infra-red energy so that said tube-like area is produced within said housing; and means on the housing forming a door means operative to provide for the cradle to enter the housing in the transfer position and for substantially sealing the interior of the housing from the atmosphere when the cradle is removed from said interior, the housing thus forming a dry box for containing an inert gas atmosphere around the device; and means for introducing an inert gas inside the housing.

8. Apparatus for applying infra-red energy to solid state devices comprising:

lamp means for producing radiant energy whose wave length is substantially in the infra-red band, and concentrating said energy in an elongated tube-like area extending along an axis;

a shuttle mounted for reciprocating motion along a horizontal axis between a load-unload position and a transfer position, the shuttle having a plurality of cradles means serially disposed side-by-side along an axis for supporting and positioning devices in or adjacent to said tube-like area when the shuttle is in the transfer position and substantially separating the devices from the tube-like area when in the load-unload position;

a first block mounted for reciprocating motion in a generally vertical direction;

a plurality of spaced-apart bores in said first block, the axes of the bores being parallel and extending generally vertical, each bore having a stop;

a plurality of plungers respectively mounted in said bore for reciprocating motion therein;

means on each plunger respectively forming a first gripper;

a plurality of springs respectively mounted in said bores in engagement with said plungers and each spring biasing its plunger for engagement with a stop;

a second block mounted for reciprocating motion in a direction generally parallel the motion of first said block;

a plurality of arms connected to said second block for reciprocating motion therewith, each arm extending outwardly and below said first block;

means on each arm respectively forming a second gripper, the respective second grippers being positioned below said first grippers to form a plurality of pairs of grippers, the respective pairs of grippers comprising means for engaging and holding a device therebetween;

means forming a rack on first said block and means forming a rack on second said block and a rotatably mounted pinion engaging the racks, the rotation of the pinion thereby moving the first and second blocks in opposite directions;

means for rotating the pinion as between an open and a closed position, such that rotation of the pinion to the open position causes the blocks to simultaneously move in opposite directions so that the grippers are spaced apart for receiving a device therebetween when the shuttle is in the transfer position, and such that rotation of the pinion to the closed position causes the blocks to simultaneously move in opposite directions so that each of said first and second grippers moves to engage a device and then continue to move to lift the device out of the cradle and thus move the first grippers back against the spring pressure, last said movement continuing until the devices are in desired position and said tube-like area.

* * * * *